Nov. 12, 1968     V. K. BENTON ET AL     3,410,606
COMPOSITE VEHICLE WHEEL AND METHOD OF MAKING THE SAME
Original Filed July 31, 1964
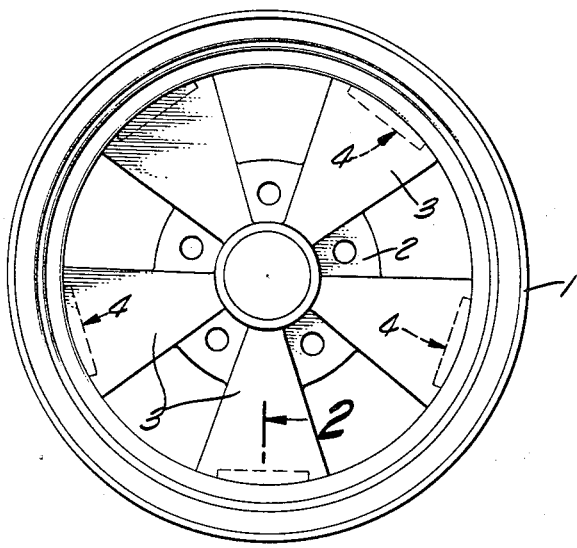
FIG. 1.
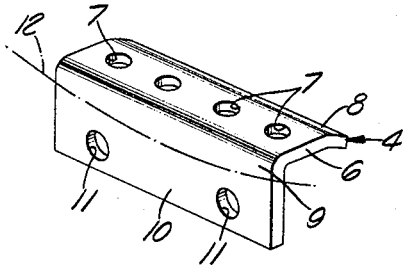
FIG. 6.
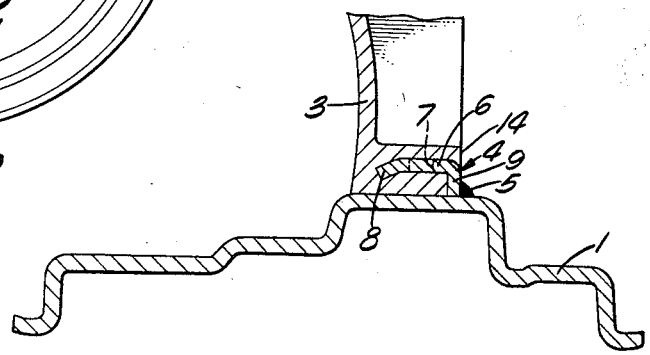
FIG. 2.
FIG. 4.
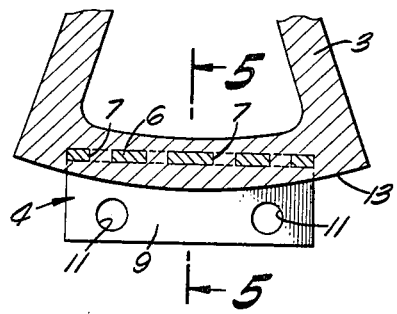
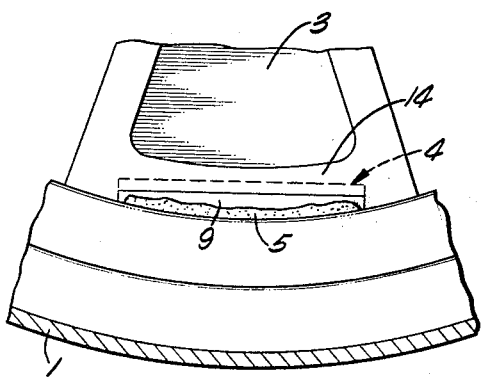
FIG. 3.
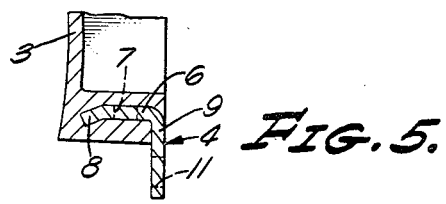
FIG. 5.
INVENTOR.
VIRGIL K. BENTON
JAMES C. BENNETT
BY
Paul A. Weilein
ATTORNEY United States Patent Office 3,410,606
Patented Nov. 12, 1968

3,410,606
COMPOSITE VEHICLE WHEEL AND METHOD OF
MAKING THE SAME
Virgil K. Benton, Ontario, and James C. Bennett, Los
Angeles, Calif., assignors to Electro Chemical Industries, Inc., Pomona, Calif., a corporation of California
Continuation of application Ser. No. 386,674, July 31,
1964. This application Oct. 13, 1966, Ser. No. 586,567
2 Claims. (Cl. 301—65)

ABSTRACT OF THE DISCLOSURE

A vehicle wheel assembly and hub structure in which a hub of a metal other than steel, such as aluminum, is constructed with spaced rim mounting portions carrying steel elements, each of which elements includes an elongate plate with a flange at one edge, the plate being embedded as by casting in the rim mounting portion of the hub so that the flange is countersunk therein and extends radially outwardly with the outer edge of the flange being curved and engaging the inner periphery of the rim, and with a side surface extending outwardly to the rim and connected by a bead weld to the rim. The plate has openings for interlockingly receiving material of the hub during casting and at the opposite edge is provided with an angularly deflected rectilinear reinforcing and stiffening flange which is also embedded. Prior to affixing the hub to the rim, the flange at said one edge projects radially beyond the periphery of the rim mounting portions, and such projection portion is cut off to conform to the peripheral surface of the mounting portion and to provide a curved edge corresponding to the rim curvature.

This application is a continuation of application Serial No. 386,674, filed July 31, 1964, now abandoned.

The present invention relates to vehicle wheels and more particularly to a composite vehicle wheel of the type comprising a light metal hub section and a steel rim and to the method of making the same.

It is the practice to construct vehicle wheels comprising a steel rim and a steel hub with the hub welded within the inner periphery of the rim, but in the manufacture of light weight wheels the welding of the light metal hub sections which are typically composed of aluminum or magnesium within an outer wheel rim composed of a steel has not been feasible. Various modes of rim attachment to the light metal hub have been resorted to including the riveting of hub spokes to the rim, but such practice is disadvantageous in the use of modern day tubeless pneumatic tires, the use of which requires an air tight rim, since the riveted connection affords an opportunity for loss of air.

Accordingly, an object of the present invention is to provide a light-weight wheel assembly comprising a light metal hub and a steel rim wherein the hub and rim are so interconnected as to eliminate the formation of openings through which air may escape in the event that the rim has a tubeless tire ultimately mounted thereon.

More particularly, an object of the invention is to provide a light-weight wheel assembly of a light metal hub and a steel rim wherein the hub is welded to the inner periphery of the rim so as to provide a rugged and durable connection, which will not permit loss of air through the rim.

Yet another object is to provide means for connecting a light metal hub to a steel wheel rim wherein portions of the hub are provided with steel inserts having a surface exposed and contiguous to a portion of the steel rim when the two are disposed in assembled relation whereby to enable the laying of a bead of weld to unite the hub to the rim.

A further object is to provide a wheel hub assembly of light weight material having embedded therein a steel insert which is rigidly and durably connected to the hub and which has a face exposed for welding to a steel rim upon assembly of the hub within the rim.

Still another object of the invention is to provide a method of making composite wheel assemblies including a light metal hub and a steel rim in accordance with the preceding objectives, such method contemplating the rigid uniting with outer peripheral portions of the light metal hub circumferentially spaced steel elements, inserting the light metal hub within the inner periphery of a steel rim, and welding the steel elements to the inner periphery of the rim. More specifically, this objective contemplates the placement in a plurality of circumferentially spaced locations about the outer margin of a wheel hub mold of a plurality of steel elements which are held in position as molten light metal is placed in the mold so that upon hardening of the molten metal the steel elements will be rigidly united with circumferentially spaced outer portions of the hub to enable subsequent welding of the hub within the rim by the forming of a bead of weld at the juncture of a surface of the steel elements and an inner peripheral surface of the wheel rim.

Other objects and advantages of the invention will hereinafter be described or will become apparent to those skilled in the art and the novel features of the invention will be described in the appended claims.

In the accompanying drawings:

FIG. 1 is an outside elevation of a light weight wheel construction made in accordance with the invention;

FIG. 2 is a fragmentary radial sectional view as taken on the line 2—2 of FIG. 1 and on a somewhat enlarged scale;

FIG. 3 is a fragmentary inside elevational view of the wheel rim and hub assembly on a somewhat enlarged scale;

FIG. 4 is a fragmentary detail view in section transverse to the axis of the wheel hub and showing a steel insert united with the spokes, preliminary to assembly with the wheel rim;

FIG. 5 is a sectional view as taken on the line 5—5 of FIG. 4; and

FIG. 6 is a detail view in perspective illustrating an insert for use in connection with the present invention.

Like reference characters in the several views of the drawing and in the following description designate corresponding parts.

Referring first to FIG. 1, there is generally shown a wheel assembly made in accordance with the present invention and comprising a rim 1 in which is disposed a hub 2 having a plurality of radiating spokes 3, the spokes being within the confines of the inner periphery of the rim 1 as is customary in vehicle wheel assemblies.

Referring to FIG. 2, there is illustrated in more detail a steel insert generally denoted at 4 adapted to be made a part of the outer extremity of the spokes 3 and to facilitate the formation of a bead of weld 5 which will unite the spokes 3 to the inner periphery of the wheel rim 1 in a rigid and durable fashion without requiring the formation of openings for rivets or other fasteners through the rim and through which openings air may find escape when typical tubeless tires are used upon rims made in accordance with the invention.

An insert 4 in the illustrative embodiment comprises a main plate 6 of suitable form having a plurality of openings 7 therethrough and preferably having at one edge an angularly disposed flange 8 and at its other edge having a flange 9.

The hub 2 and spokes 3 in accordance with the present invention are preferably composed of light weight metal such as aluminum or magnesium and it is the purpose of the insert 4 to afford attachment means weldable to the inner periphery of the steel rim 1. Accordingly, the insert is unitized with the spokes 3 during the casting of the hub and spokes in accordance with the preferred embodiment of the invention. Thus, the flange 9 has a portion 10 projecting outwardly from the plate 6 which is provided with suitable openings 11, whereby the insert 4 may be positively located and fixed by suitable jigs within a mold in which the hub and spokes may be cast with the inserts located in a plurality of circumferentially spaced locations at the outer margin of a mold, and with the flange portions 10 extending outwardly beyond the outer margin of the mold. During the casting operation the light metal material will flow through the plate openings 7 so that the plate will be effectively and rigidly unitized with the spokes.

Further rigidity of mounting of the plates within the spokes is accomplished by the angularly disposed edge flange 8 on the plate 6, but it will be appreciated that various other contour irregularities may be resorted to for the purpose of effecting a rigid an dstrong interconnection between the plates 4 and the respective spokes.

It will also be appreciated that when the light metal hub and spokes casting is removed from the mold, the projecting portion 10 of the edge flange 9 may be cut away or otherwise removed as, for example, on the broken line 12 of FIG. 6, or as viewed in FIG. 4 along the arcuate end surface 13 of the spokes 3, whereby the spokes will mate with the inner periphery of the rim 1.

It will be further noted upon reference to FIGS. 2 and 3, that an outer side face of the edge flange 9 is exposed at the inside of the inner wall 14 of the spokes 3 so that when the hub and spoke casting is placed within the inner periphery of the rim 1 the bead of welding 5 may be laid at the juncture of the insert wall 9 and the inner periphery of the rim 1.

It will now be apparent that with such a construction as has heretofore been described, the light weight aluminum or magnesium hub and spoke casting is rigidly and durably interconnected with the steel rim without requiring the use of ordinary fastening elements to assure interlocking spoke and rim formations and that no openings are made in the rim 1 through which air may be lost in the event that tubeless tires are employed.

While the specific details of the invention have been herein shown and described, changes and alterations may be resorted to without departing from the spirit of the invention as defined in the appended claims.

We claim:

1. A light weight hub of a metal other than steel for connection in a steel wheel rim; comprising outter peripheral rim mounting portions; said hub portions having steel elements carried thereby and having an exposed side face disposed at the juncture of outer peripheral surfaces of said outer peripheral hub portions with side faces of said hub portions to afford the welding thereof to said rim; said steel elements each including a portion projecting radially outwardly beyond said respective hub portions.

2. A hub structure for connection with a steel rim to form a vehicle wheel, comprising: a hub made of nonferrous metal and having a peripheral surface; steel elements carried by said hub to afford the welding thereof to the steel rim; each of said steel elements including a plate and a flange extending at an angle to one edge of said plate; said plate being embedded in said hub with said flange extended radially outwardly from said plate and with a side surface exposed on a side surface of said hub, said flange projecting radially outwardly beyond said peripheral surface.

References Cited

UNITED STATES PATENTS

| 2,008,933 | 7/1935 | Sinclair | 301—65 |
| 2,164,883 | 7/1939 | Moore | 301—6 |
| 2,439,881 | 4/1948 | Ash | 301—65 |
| 2,653,547 | 9/1953 | Langdon | 29—470.7 X |
| 3,250,571 | 5/1966 | Richter | 301—65 |
| 3,250,572 | 5/1966 | Walker | 301—65 |

FOREIGN PATENTS 387,086  2/1933  Great Britain.

RICHARD J. JOHNSON, *Primary Examiner.*